(12) United States Patent
Fukui et al.

(10) Patent No.: US 7,652,781 B2
(45) Date of Patent: Jan. 26, 2010

(54) DATA PROCESSING SYSTEM, DATA PROCESSING METHOD, AND DATA PROCESSING PROGRAM PRODUCT SUITED FOR TRANSMITTING AND RECEIVING DATA AMONG A PLURALITY OF IMAGE PROCESSING APPARATUSES

(75) Inventors: Kazuyuki Fukui, Toyohashi (JP); Mikio Masui, Kobe (JP); Hiroyuki Ozawa, Kawasaki (JP); Shuichiro Kaneko, Yokohama (JP); Norihisa Takayama, Kobe (JP); Yoshikazu Ikenoue, Itami (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 470 days.

(21) Appl. No.: 11/254,738

(22) Filed: Oct. 21, 2005

(65) Prior Publication Data

US 2007/0011410 A1 Jan. 11, 2007

(30) Foreign Application Priority Data

Jul. 5, 2005 (JP) ............................. 2005-196801

(51) Int. Cl.
*G06F 15/00* (2006.01)
*G06F 13/00* (2006.01)
(52) U.S. Cl. ..................................... 358/1.15; 358/1.13
(58) Field of Classification Search .................. 358/1.1, 358/1.9, 1.13, 1.15, 474, 402, 400
See application file for complete search history.

(56) References Cited

U.S. PATENT DOCUMENTS

| 6,246,487 | B1 | 6/2001 | Kobayashi et al. |
| 6,801,340 | B1 | 10/2004 | Endo |
| 7,191,237 | B2 * | 3/2007 | Jodra et al. ................. 709/228 |
| 2002/0099707 | A1 * | 7/2002 | Matsumoto ................... 707/10 |
| 2005/0171957 | A1 * | 8/2005 | Tanaka ......................... 707/10 |
| 2005/0219613 | A1 * | 10/2005 | Hirashima ................. 358/1.15 |

FOREIGN PATENT DOCUMENTS

| CN | 1496078 A | 5/2004 |
| EP | 0 929 023 A1 | 7/1999 |

(Continued)

OTHER PUBLICATIONS

European Search Report dated Aug. 14, 2006.

(Continued)

*Primary Examiner*—Gabriel I Garcia
(74) *Attorney, Agent, or Firm*—Buchanan Ingersoll & Rooney PC

(57) ABSTRACT

In order to facilitate the designation of a destination of data while allowing the data to be delivered in a processing method desired by a user at the destination, an MFP includes a registration portion to register for each user a processing method for processing data, a destination designation portion to display a user registered in the registration portion in such a manner that the user can be designated as a destination, a data designation portion to designate data to be delivered to the destination designated by the destination designation portion, and a data processing portion to process data by the processing method registered in the registration portion for the user if data whose destination is the user registered in the registration portion has been delivered.

15 Claims, 9 Drawing Sheets

FOREIGN PATENT DOCUMENTS

| | | |
|---|---|---|
| EP | 1 120 701 A1 | 8/2001 |
| JP | 6-62146 | 3/1994 |
| JP | 8-167916 A | 6/1996 |
| JP | 10-42114 | 2/1998 |
| JP | 11-184777 | 7/1999 |
| JP | 11-355351 A | 12/1999 |
| JP | 2001-249929 | 9/2001 |
| JP | 2001-306204 | 11/2001 |
| JP | 2001-313745 A | 11/2001 |
| JP | 2001-326763 A | 11/2001 |
| JP | 2003-167823 A | 6/2003 |
| JP | 2004-15629 | 1/2004 |
| JP | 2004-185423 | 7/2004 |
| JP | 2004-336288 A | 11/2004 |
| JP | 2005-20223 | 1/2005 |
| WO | 02/41133 A2 | 5/2002 |

OTHER PUBLICATIONS

Japanese Office Action (with English language translation) dated Nov. 6, 2007.

* cited by examiner

Fig. 6A
USER INFORMATION OF MFP 100

| NUMBER | USER IDENTIFICATION INFORMATION | E-mail ADRESS | FACE IMAGE | PASSWORD | PROCESSING METHOD |
|---|---|---|---|---|---|
| 1 | DAVID | david@xxx.jp | david.jpg | xxx | MAIL TRANSMISSION |

Fig. 6B
USER INFORMATION OF MFP 100A

| NUMBER | USER IDENTIFICATION INFORMATION | E-mail ADRESS | FACE IMAGE | PASSWORD | PROCESSING METHOD |
|---|---|---|---|---|---|
| 2 | JULIE | julie@xxx.jp | julie.jpg | xxxx | FAX TRANSMISSION 03-3333-3333 |

Fig. 6C
USER INFORMATION OF MFP 100B

| NUMBER | USER IDENTIFICATION INFORMATION | E-mail ADRESS | FACE IMAGE | PASSWORD | PROCESSING METHOD |
|---|---|---|---|---|---|
| 3 | TED | ted@xxx.jp | ted.jpg | xxxxx | DATA TRANSMISSION |

Fig. 6D
USER INFORMATION OF MFP 100C

| NUMBER | USER IDENTIFICATION INFORMATION | E-mail ADRESS | FACE IMAGE | PASSWORD | PROCESSING METHOD |
|---|---|---|---|---|---|
| 4 | MICHAEL | michael@xxx.jp | michael.jpg | xxxxx | PRINT, IP ADDRESS OF PRINTER |
| 5 | SUSAN | susan@xxx.jp | susan.jpg | xxxxxx | MAIL TRANSMISSION |

Fig. 8

USER LIST

| NUMBER | USER IDENTIFICATION INFORMATION | E-mail ADRESS | FACE IMAGE | PASSWORD | HOME TERMINAL |
|---|---|---|---|---|---|
| 1 | DAVID | david@xxx.jp | david.jpg | xxx | IP ADDRESS OF MFP 100 |
| 2 | JULIE | julie@xxx.jp | julie.jpg | xxxx | IP ADDRESS OF MFP 100A |
| 3 | TED | ted@xxx.jp | ted.jpg | xxxxx | IP ADDRESS OF MFP 100B |
| 4 | MICHAEL | michael@xxx.jp | michael.jpg | xxxxx | IP ADDRESS OF MFP 100C |
| 5 | SUSAN | susan@xxx.jp | susan.jpg | xxxxxx | IP ADDRESS OF MFP 100C |

DATA PROCESSING SYSTEM, DATA PROCESSING METHOD, AND DATA PROCESSING PROGRAM PRODUCT SUITED FOR TRANSMITTING AND RECEIVING DATA AMONG A PLURALITY OF IMAGE PROCESSING APPARATUSES

This application is based on Japanese Patent Application No. 2005-196801 filed with Japan Patent Office on Jul. 5, 2005, the entire content of which is hereby incorporated by reference.

BACKGROUND OF THE INVENTION

1. Field of the Invention

The present invention relates to a data processing system, a data processing method, and a data processing program product, and more specifically to a data processing system, a data processing method, and a data processing program product suited for transmitting and receiving data among a plurality of image processing apparatuses connected to a network.

2. Description of the Related Art

Conventionally, when data is to be transmitted, the sender is required to set a variety of information related to the receiver and the destination of the transmission. For instance, when a document is to be transmitted by facsimile, the sender is required to set the facsimile number of the receiver, and when an image scanned by a copying machine is to be transmitted by an electronic mail, the sender is required to set the electronic mail address of the receiver. Moreover, with regard to an FTP (File Transfer Protocol) transmission function and an SMB (Server Message Block) transmission function provided in recent copying machines, the setting of information (FTP server address, name of personal computer, etc.) of the receiver by the sender is required. Although, upon the actual transmission, the information of the receiver need not be set every time if the information of the receiver is registered in advance, the information of the receiver is required upon the registration nonetheless.

Thus, when such information of the receiver as a facsimile number, an electronic mail address, an FTP server address, and a name of the personal computer is unknown, data cannot be transmitted to the receiver. Therefore, advance confirmation of the information of the receiver will be required, which is rather a troublesome task for the sender.

In addition, since the sender basically selects as a transmission method one of a facsimile transmission, an electronic mail transmission, an FTP transmission, an SMB transmission, and the like at his convenience, the transmitted data is not in a form that takes the convenience of the receiver into consideration. Sometimes, after receiving the data, the receiver is forced to process the received data in some way later on in order to make the data easier to utilize, and at other times, the receiver may not even be able to perform such processing and thus feel inconvenienced. In order to resolve such inconvenience, the sender must confirm the transmission method desired by the receiver before the transmission.

On the other hand, Japanese Patent Laying-Open No. 2005-20223 describes an image processing apparatus including a transmission means that transmits image information and an image information accumulating means that accumulates at a registered address the image information received by the transmission means, wherein the image processing apparatus is characterized in that it includes a registered address information transmission means that, upon reception of a request from the other end of the communication or upon reception of an address designation command that designates an unregistered address, transmits the information related to the registered address to the other end of the communication according to the request or the address designation command. The image processing apparatus according to Japanese Patent Laying-Open No. 2005-20223 is a facsimile machine.

With the image processing apparatus according to Japanese Patent Laying-Open No. 2005-20223, upon a facsimile transmission, the facsimile transmission can be performed without the sender making an inquiry to the receiver even when the sender has forgotten the information related to the address registered in the facsimile on the receiver side; however, the sender needs to know the facsimile number of the facsimile on the receiver side. Moreover, since the receiver can only receive the data through a facsimile, the demand of the receiver will not be met when, for instance, the receiver desires an image of a resolution higher than that of an image received by a facsimile.

SUMMARY OF THE INVENTION

The present invention is made to solve the above-described problems, and an object of the present invention is to provide a data processing system which facilitates the designation of a destination of data while allowing the data to be delivered in a processing method desired by a user at the destination.

Another object of the present invention is to provide a data processing method which facilitates the designation of a destination of data while allowing the data to be delivered in a processing method desired by a user at the destination.

A still another object of the present invention is to provide a data processing program product which facilitates the designation of a destination of data while allowing the data to be delivered in a processing method desired by a user at the destination.

To achieve the above-described objects, according to one aspect of the present invention, a data processing system includes a registration portion to register for each user a processing method for processing data, a destination designation portion to display a user registered in the registration portion in such a manner that the user can be designated as a destination, a data designation portion to designate data to be delivered to the destination designated by the destination designation portion, and a data processing portion to process data by the processing method registered in the registration portion for the user if data whose destination is the user registered in the registration portion has been delivered.

According to the present invention, a processing method for processing data is registered for each user, and the registered user is displayed in such a manner that the user can be designated as a destination so that there is no need to input the information of the destination, and it is only required to designate the user as the destination. Moreover, when data whose destination is the user has been delivered, the data is processed by the processing method registered for that user so that the sender can deliver the data without confirming the processing method desired by the user who is set as the destination, and the user at the destination can obtain data processed by the desired processing method. As a result, a data processing system can be provided which facilitates the designation of a destination of data while allowing the data to be delivered in a processing method desired by the user at the destination.

According to another aspect of the present invention, a data processing method includes the steps of registering for each user a processing method for processing data, displaying a user for whom the processing method is registered in such a manner that the user can be designated as a destination and accepting designation of the destination, designating data to be delivered to the destination designated, and processing data by the processing method registered for the user if data has been delivered whose destination is the user for whom the processing method is registered.

According to the present invention, a data processing method can be provided which facilitates the designation of a destination of data while allowing the data to be delivered in a processing method desired by the user at the destination.

According to a further aspect of the present invention, a data processing program product stores a data processing program that causes a computer to execute the steps of registering for each user a processing method for processing data, and upon setting output of data, displaying a user for whom the processing method is registered in such a manner that the user can be designated as a destination and accepting designation of the destination, and designating data to be delivered to the destination designated, and upon outputting of data, processing data by the processing method registered for the user if data has been delivered whose destination is the user for whom the processing method is registered.

According to the present invention, a data processing program product can be provided which facilitates the designation of a destination of data while allowing the data to be delivered in a processing method desired by a user at the destination.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 6A to 6D are diagrams showing an example of user information.

FIG. 8 is a diagram showing an example of a user list.

DESCRIPTION OF THE PREFERRED EMBODIMENT

Figure 1:
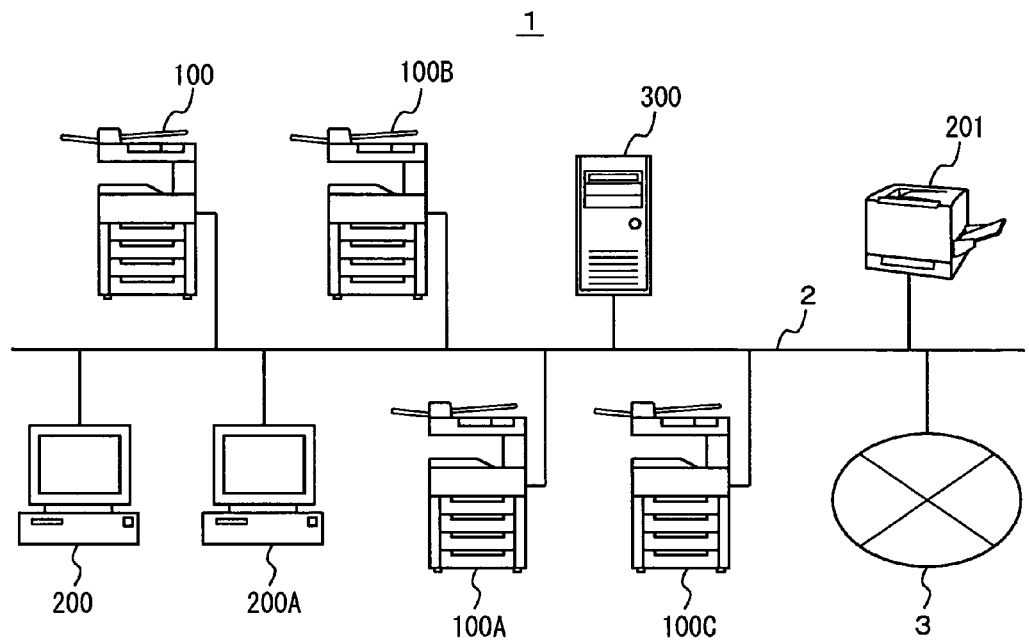
FIG. 1 is an overall schematic diagram of a data processing system according to one embodiment of the present invention.

The embodiment of the present invention will be described below with reference to the drawings. In the following description, the same or corresponding parts are denoted by the same reference characters. Their names and function are also the same. Thus, a detailed description thereof will not be repeated.

FIG. 1 is an overall schematic diagram showing a data processing system according to one embodiment of the present invention. With reference to FIG. 1, a data processing system 1 includes multi function peripherals (referred to as "MFP" below) 100, 100A, 100B, and 100C, personal computers (hereinafter referred to as "PC") 200 and 200A, a printer 201, and a server 300, respectively connected to a network 2. PCs 200 and 200A, and server 300 are conventional computers. Their arrangement and function are well known so that the description thereof will not be repeated. The arrangement and the function of MFP 100, 100A, 100B, and 100C are the same so that MFP 100 will be described here as an example unless otherwise noted.

MFP (Multi Function Peripheral) 100 includes a scanner for scanning a sheet of original manuscript, an image forming portion for forming an image on recording media such as a sheet of paper based on image data, and a facsimile, and has an image scanning function, a copying function, and a facsimile transmission and reception function. Moreover, although MFP 100 is described as an example in the this embodiment, MFP 100 can be replaced by an apparatus having a function for processing an image, for instance, a scanner, an image forming apparatus, a facsimile, a personal computer for generating image data, and the like.

Network 2 is a local area network (LAN) and is connected to the Internet 3 via a gateway. Network 2 can be fixed-line or wireless. In addition, network 2 is not limited to a LAN and can be a wide area network (WAN) such as the Internet, a network using general public lines, and so on.

Figure 2:
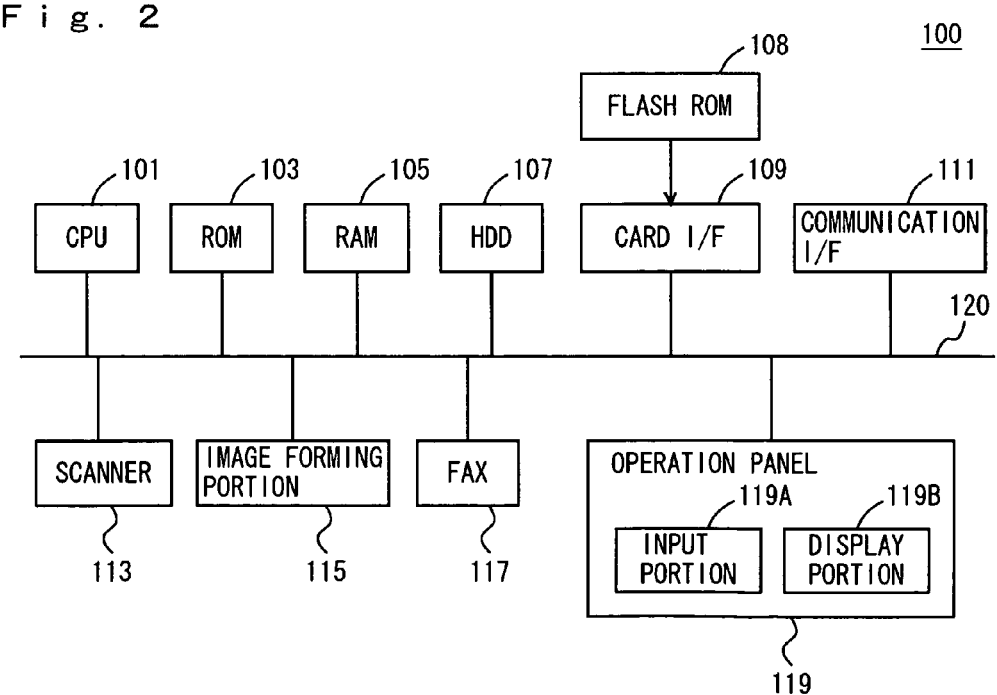
FIG. 2 is a block diagram showing a hardware arrangement of an MFP according to the present embodiment.

FIG. 2 is a block diagram showing a hardware arrangement of MFP 100 according to this embodiment. With reference to FIG. 2, MFP 100 includes, respectively connected to a bus 120, a central processing unit (CPU) 101, a ROM (Read Only Memory) 103 that stores a program or the like to be executed by CPU 101, a RAM (Random Access Memory) 105 for loading a program to be executed and for storing data during execution of the program, a hard disk drive (HDD) 107 for storing data in a nonvolatile manner, a card interface (I/F) 109 to which a flash ROM 108 is attached, a communication I/F 111 for connecting MFP 100 to network 2, a scanner 113, an image forming portion 115, a facsimile (FAX) 117, and an operation panel 119 as an interface with a user.

CPU 101 loads into RAM 105 and executes a data processing program stored in flash ROM 108 attached to card I/F 109. Moreover, the program executed by CPU 101 is not limited to the data processing program stored in flash ROM 108, and a program stored in an EEPROM (Electrically Erasable/Programmable Read Only Memory) connected additionally to CPU 101 can be loaded into RAM 105 and be executed. The use of an EEPROM makes it possible to rewrite or additionally write a data processing program. Thus, PCs 200, 200A, or server 300 connected to network 2 can rewrite the data processing program stored in the EEPROM of MFP 100 or additionally write a new data processing program into the EEPROM. Furthermore, MFP 100 can download a data processing program from another computer connected to Internet 3 and store the data processing program in an EEPROM. Moreover, CPU 101 may load into RAM 105 and execute a data processing program which is saved in HDD 107.

The program referred to here not only includes a program directly executable by CPU 101, but also a program in a source program format, a compressed program, an encrypted program, and the like.

Image forming portion 115 is a laser printer, an ink jet printer, or the like, and makes image data visible on recording media such as a sheet of paper. Scanner 113 includes a photoelectric transducer such as a CCD (Charge Coupled Device) and the like, and optically reads a sheet of original manuscript and outputs electronic data that is the image data. FAX 117 transmits and receives the image data according to the facsimile standard via a public telephone line.

Operation panel 119 includes an input portion 119A and a display portion 119B. Input portion 119A is an input device such as a touch panel, a keyboard, or a mouse for accepting an input of operation by a user of MFP 100. Display portion 119B is a liquid crystal display or an organic EL (Electro-Luminescence) display panel. When using a touch panel formed of a transparent member for input portion 119A, the touch panel is provided overlapping display portion 119B so that an instruction of a button displayed on display portion 119B can be detected. Thus, input of a variety of operations becomes possible.

Communication I/F 111 is a communication interface for connecting MFP 100 to network 2. Thus, it becomes possible for MFP 100 to communicate with other MFPs 100A, 100B, and 100C, PCs 200 and 200A, and server 300. Although MFP 100 is connected to other MFPs 100A, 100B, and 100C, PCs 200 and 200A, and server 300 via network 2, it can also be connected directly using a serial interface or a parallel interface. Communication I/F 111 uses an interface that corresponds to the form of connection between MFP 100 and other MFPs 100A, 100B, and 100C.

The input of data into MFP 100 includes the following cases: (1) when scanner 113 scans a sheet of original manuscript and the image data is inputted; (2) when image data is received from a computer or from other MFPs 100A, 100B, and 100C connected to network 2 via communication I/F 111; (3) when image data store in flash ROM 108 is read via card I/F 109; and (4) when facsimile data is received in FAX 117. The data inputted into MFP 100 is given a file name and is temporarily stored in a prescribed area of HDD 107.

The output of data from MFP 100 includes the following cases: when the data stored in HDD 107 is (1) made visible on recording media such as a sheet of paper by image forming portion 115, (2) transmitted to a computer or to other MFPs 100A, 100B, and 100C connected to network 2 via communication I/F 111, (3) stored in flash ROM 108, (4) outputted as facsimile data by FAX 117, and (5) displayed on display portion 119B.

Moreover, storage media that stores a data processing program is not limited to flash ROM 108 and can also be the media that records a program in a fixed manner, such as a flexible disk, a cassette tape, an optical disk [MO (Magnetic Optical Disc)/MD (Mini Disc)/DVD (Digital Versatile Disc)], an IC card (including a memory card), an optical card, and a semiconductor memory such as a masked ROM, an EPROM, an EEPROM, and the like.

Figure 3:
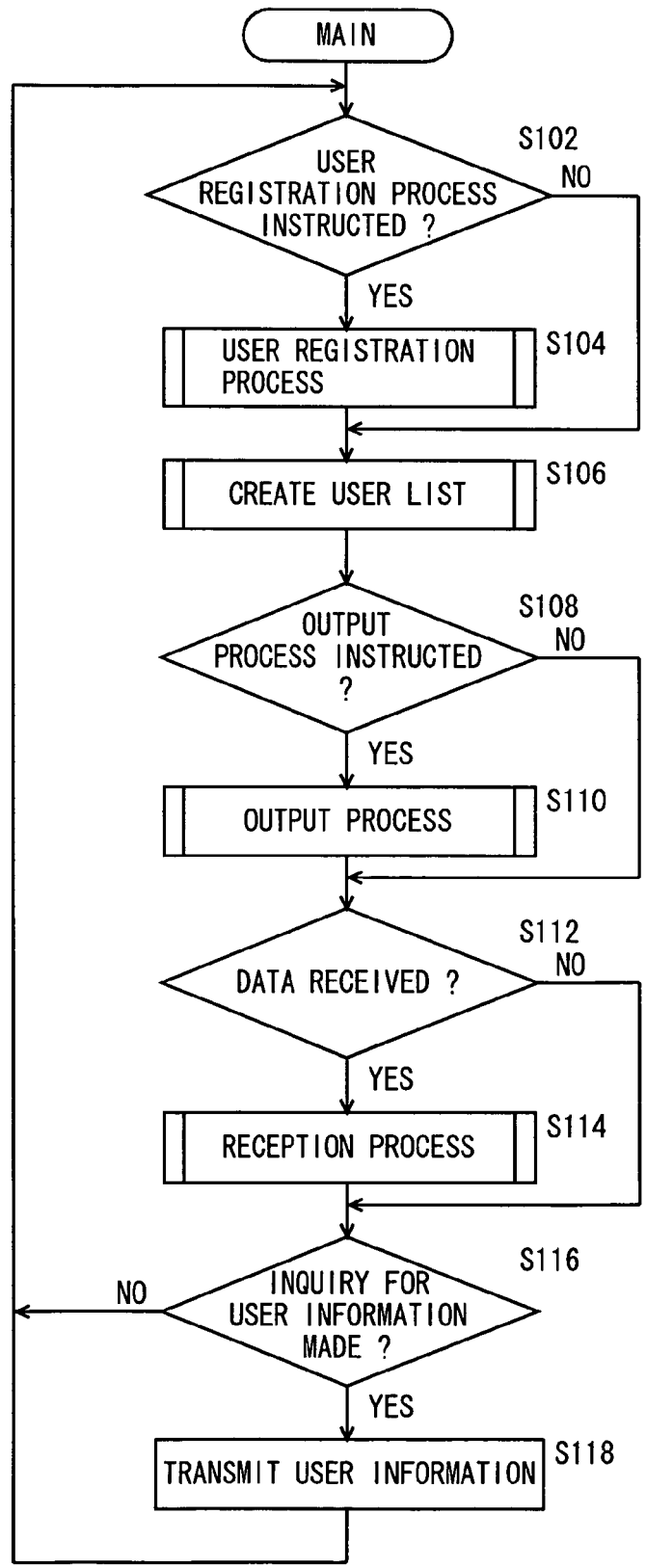
FIG. 3 is a flow chart showing a flow of a main process executed by the MFP.

FIG. 3 is a flow chart showing a flow of a main process executed by the MFP. With reference to FIG. 3, if the execution of a user registration process is instructed (YES in step S102), MFP 100 executes the user registration process (step S104), but if the execution of the user registration process is not instructed, the process skips step S104 and proceeds to step S106. The user registration process will be described later. User information related to a user registered by the user registration process is stored in HDD 107. Then, a user list creation process is executed in step S106. Here, an example is illustrated in which the user list creation process is executed constantly; however, the user list creation process can be executed upon the start-up of MFP 100 or at prescribed time intervals.

Next, if the execution of an output process is instructed (YES in step S108), the output process is executed (step S110), but if the execution of the output process is not instructed, the process skips step S110 and proceeds to step S112. Next, in step S112, it is determined whether data is received or not, and if it is received, a reception process is executed (step S114), and if it is not received, the process skips step S114 and proceeds to step 116. In the next step, S116, it is determined whether an inquiry requesting user information has been made or not. If the inquiry has been made, registered user information from the user information stored in HDD 107 is transmitted to MFPs 100A, 100B, and 100C which made the inquiry (step S118), but if no inquiry has been made, the process skips step S118 and returns to step 102.

Figures 4, 5:
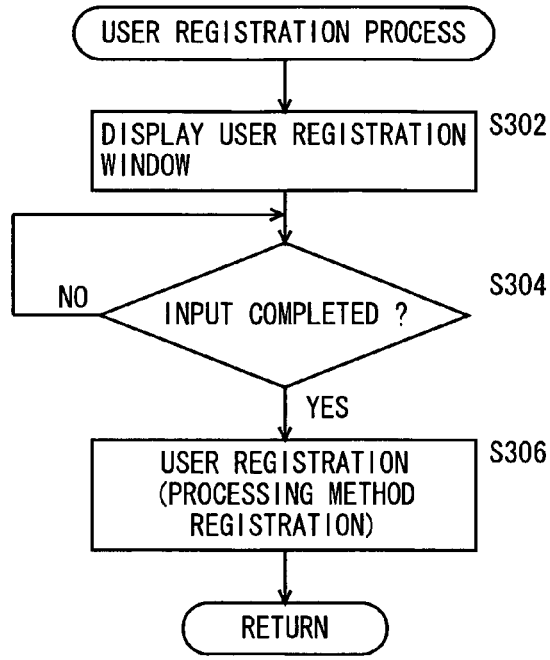
FIG. 4 is a flow chart showing a flow of a user registration process executed in step S104 of FIG. 3.
FIG. 5 is a diagram showing an example of a user registration window.

FIG. 4 is a flow chart showing a flow of the user registration process executed in step S104 of FIG. 3. With reference to FIG. 4, MFP 100 displays a user registration window on display portion 119B (S302). Then, an acceptance of an input of the user information is waited for until the input is completed (NO in step S304), and if an instruction of the completion of the input of the user information is inputted (YES in step S304), the process proceeds to step S306. In step S306, user registration is performed by storing in a prescribed area of HDD 107 the user information inputted according to the user registration window (step S306). Then, the process returns to the main process.

In the data processing system according to this embodiment, with each of MFPs 100, 100A, 100B, and 100C, a user who mainly uses the MFP is registered by having the user registration process executed therein. Here, based on the user, any of MFPs 100, 100A, 100B, and 100C storing the user information of that user is referred to as a "home terminal." For instance, if the user information of the user "David" is stored in MFP 100, a home terminal of the user "David" is MFP 100. Moreover, the user information is stored in each of MFPs 100, 100A, 100B, and 100C to define a user who mainly uses the MFP but not to prohibit the user whose user information is not stored therein from using it.

FIG. 5 is a diagram showing an example of the user registration window. With reference to FIG. 5, the user registration window includes an area to input registered user information and an area to input a processing method. The area to input the registered user information includes an area to input a user name, an area to input a password, an area to designate image data of a face image, an area to display designated face image data, and an area to input an electronic mail address. The user name inputted is accepted as user identification information for identifying the user. The password is accepted as authentication information used together with user identification information. For the area to designate the image data of the face image, an input of a file name can be accepted. A user may input into MFP 100 in advance the image data obtained, for instance, by capturing his own face, and the file name specifying that inputted image data is inputted in the area to designate the image data of the face image. When the file name is inputted, the image data of that file is read and displayed in the user registration window. Moreover, although an area presenting the characters "FACE" is shown in the diagram for convenience, in practice the face image will be displayed. This display of the face image is to confirm whether the input of the file name is accurate or not so that the face image need not be displayed. The electronic mail address is an electronic mail address assigned to the user.

The processing method defines a process to be executed on data delivered to the user. The processing methods include "data storage," "print," "mail reception," and "FAX reception." For designating the processing method, the area to input the processing method includes the entry of "Do not output until user designates," the entry of "print at designated apparatus," the entry of "mail reception," and the entry of "FAX reception." By designating the entry of "Do not output until user designates," the processing method "data storage" is designated. By designating the entry of "print at designated apparatus," the processing method "print" is designated. By designating "mail reception," the processing method "mail reception" is designated. By designating "FAX reception," the processing method "FAX reception" is designated. The user can designate any one of these processing methods. In addition, the designation of a plurality of entries may also be allowed.

The processing method "data storage" defines a process of storing delivered data in HDD 107 of a home terminal. The delivered data is the data delivered to the user of a destination by a BOX transmission. The BOX transmission will be described in detail later. In the BOX transmission, in the case where a terminal which performs the BOX transmission is not a home terminal of the user of the destination, data is transmitted to a home terminal of the user of the destination and the data is received at the home terminal. On the other hand, in the case where the terminal which performs the BOX transmission is a home terminal of the user of the destination, there is no need to transmit the data which has become the object of the BOX transmission so that processing takes place within the home terminal. Thus, the delivered data refers to data received by a home terminal when the terminal which performs the BOX transmission is not a home terminal of the user of the destination, and it refers to data which becomes the object of processing of the BOX transmission when the terminal which performs the BOX transmission is a home terminal of the user of the destination. The processing method "print" defines a process of causing a designated apparatus to print the delivered data. In order to designate the apparatus to perform the printing, an area for inputting apparatus identification information is provided in the user registration window, and when the processing method "print" is designated, the user is required to input the apparatus identification information. The diagram shows the case where the apparatus identification information "IGC-2" assigned to MFP 100A is inputted. The processing method "mail reception" defines a process of receiving the delivered data by an electronic mail. In order to designate the destination of the electronic mail, an area for inputting an electronic mail address is provided in the user registration window, and when the processing method "mail reception" is designated, the user is required to input the electronic mail address. When the processing method "mail reception" is designated but a corresponding electronic mail address is not inputted, the electronic mail address inputted in the registered user information is used. The processing method "FAX reception" defines a process of receiving the delivered data by facsimile. In order to designate a facsimile machine which receives the facsimile, an area for inputting a facsimile number is provided in the user registration window, and when the processing method "FAX reception" is designated, the user is required to input the facsimile number.

FIGS. 6A to 6D are diagrams showing an example of user information. FIG. 6A is a diagram showing an example of user information stored in MFP 100, FIG. 6B is a diagram showing an example of user information stored in MFP 100A, FIG. 6C is a diagram showing an example of user information stored in MFP 100B, and FIG. 6D is a diagram showing an example of user information stored in MFP 100C. The user information includes registered user information and a processing method. The registered user information includes user identification information, accompanying information, and authentication information. The accompanying information is the information related to a user, such as an electronic mail address assigned to that user, face image data obtained by capturing the face of that user, and so on. The authentication information is the information used for authentication of the user at log-in, and here, a password is used. It is also possible to use the face image data as the authentication information. When biometrics authentication is used, a fingerprint, sound spectrogram, iris, vein pattern, and the like are used as the authentication information.

The processing method includes any one of "data storage," "print," "mail reception," and "FAX reception," or a combination of a plurality of them. The processing method includes apparatus identification information when "print" is designated, and includes a facsimile number when "FAX reception" is designated. When "mail reception" is designated, the processing method includes an electronic mail address in the case where this electronic mail address differs from the electronic mail address of the user information.

Figure 7:
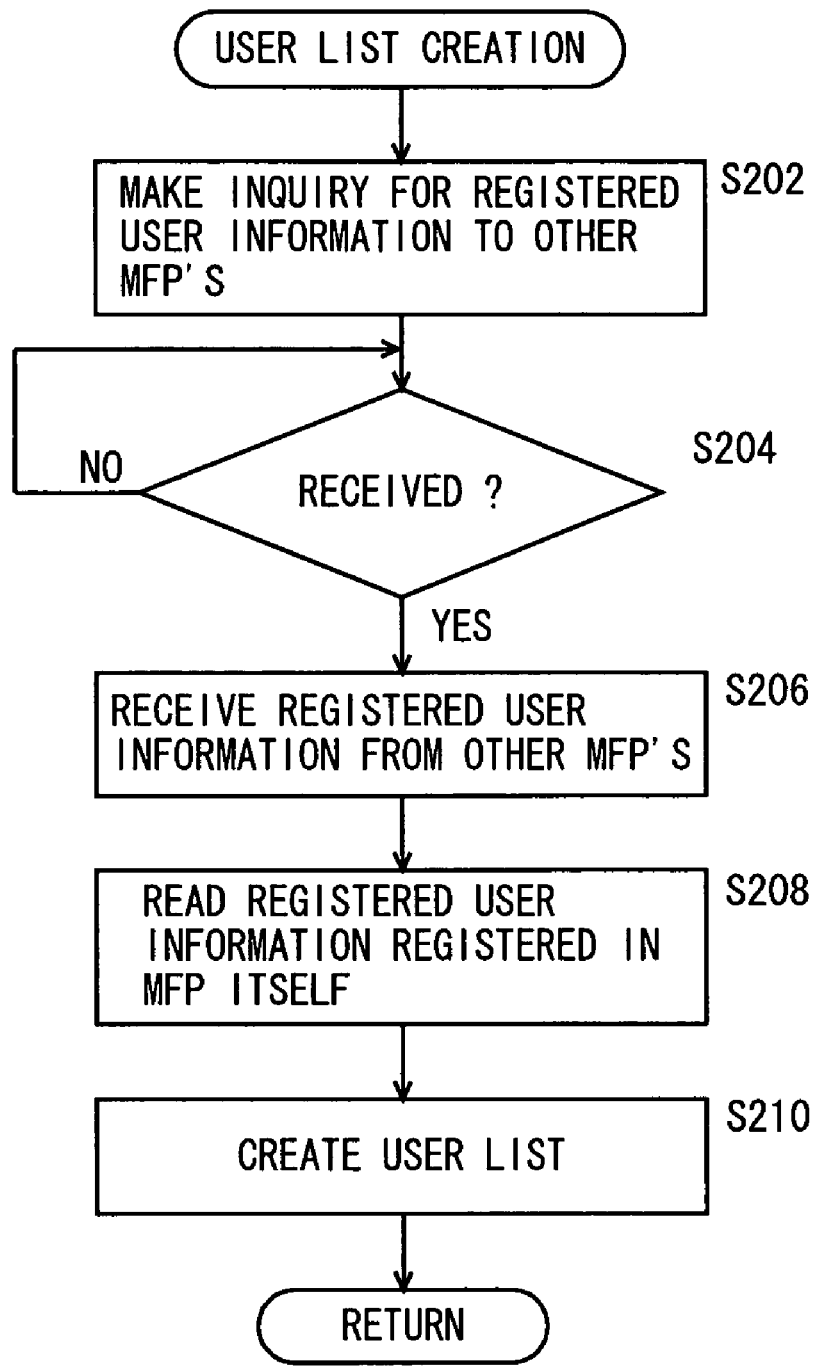
FIG. 7 is a flow chart showing a flow of a user list creation process executed in step S106 of FIG. 3.

FIG. 7 is a flow chart showing a flow of the user list creation process executed in step S106 of FIG. 3. With reference to FIG. 7, MFP 100 makes an inquiry to other MFPs 100A, 100B, and 100C for requesting a transmission of the registered user information respectively stored therein (step S202). In response to this inquiry, each of other MFPs 100A, 100B, and 100C transmits the registered user information stored in its own HDD 107 to MFP 100. In step S204, the process waits for reception of the registered user information (NO in step S204), and when the registered user information is received, the process proceeds to step S206. The registered user information is received in step S206. Here, the registered user information is received from all of other MFPs 100A, 100B, and 100C. At this time, the apparatus identification information of the terminal is received along with the registered user information so that it can be determined which of the MFPs 100A, 100B, and 100C it is that the registered user information was received from.

In step S208, the registered user information registered in MFP 100 itself is read from HDD 107. Then, a user list is created from the registered user information received in step S206 and the registered user information read in step S208 (step S210).

FIG. 8 is a diagram showing an example of a user list. With reference to FIG. 8, the user list includes a number, the registered user information, and the apparatus identification information of a home terminal. The user list only needs to include at least the user identification information and the apparatus identification information of a home terminal.

In this manner, when the user list creation process is executed in MFPs 100, 100A, 100B, and 100C, the same user list is generated and stored in MFPs 100, 100A, 100B, and 100C. Thus, data processing system 1 constructed by MFPs 100, 100A, 100B, and 100C is formed. When data processing system 1 is formed, the user who uses one of MFPs 100, 100A, 100B, and 100C as a home terminal can be specified based on the user list so that data transmission and reception among users can be performed using the user list. Such data transmission and reception is herein referred to as a BOX transmission.

Figure 9:
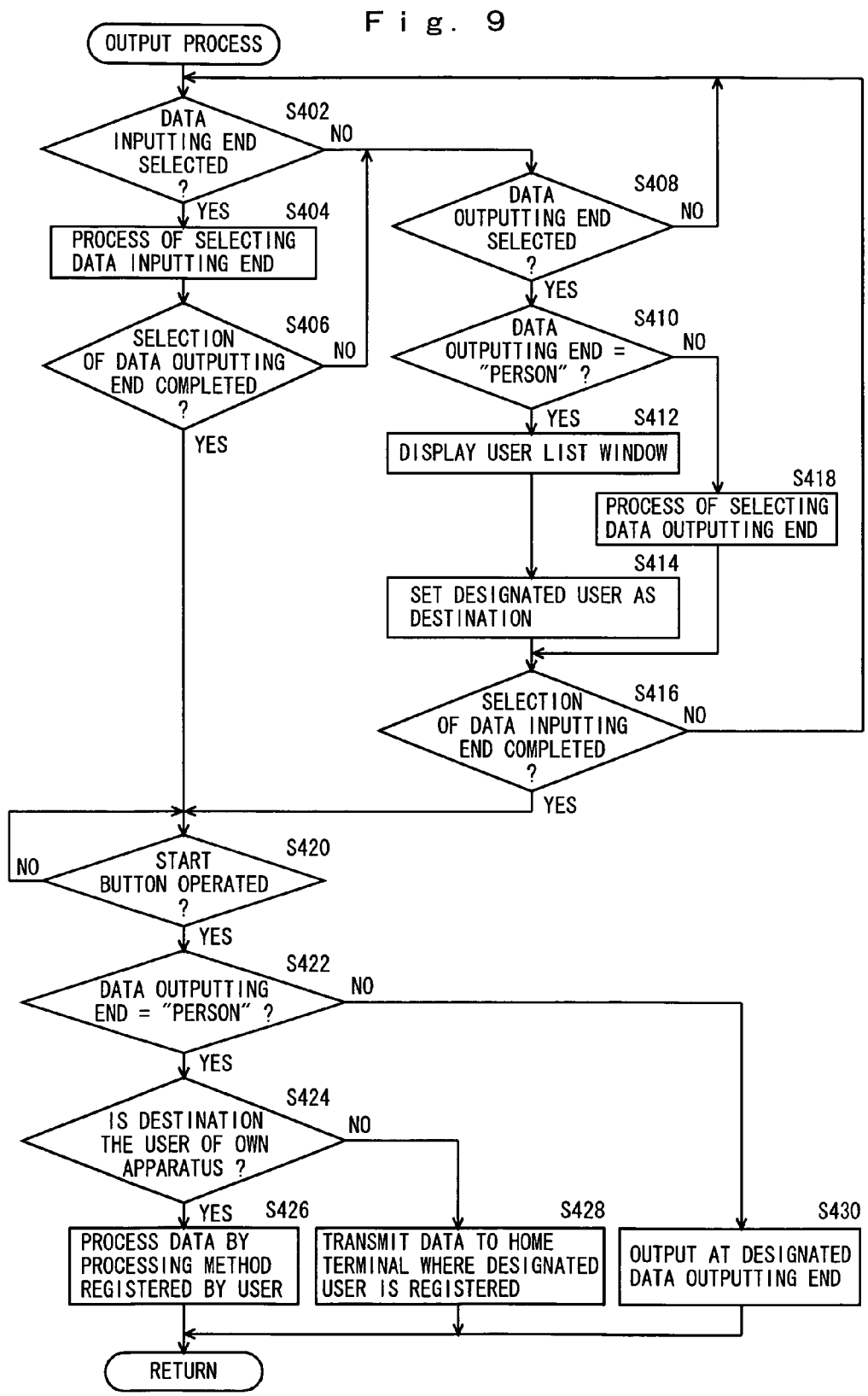
FIG. 9 is a flow chart showing a flow of an output process executed in step S110 of FIG. 3.

FIG. 9 is a flow chart showing a flow of the output process executed in step S110 of FIG. 3. With reference to FIG. 9, a job setting window is displayed on display portion 119B and a selection of a data inputting end from where data is to be inputted is accepted (step S402). The job setting window is a window for specifying the data to be transmitted and for setting an output method of outputting the data to be transmitted. The job setting window will be described later. If the selection of the data inputting end is accepted, the process proceeds to step S404, but if it is not accepted, the process proceeds to step S408. In step S404, a process of selecting the data inputting end is executed. The selection process of selecting the data inputting end is a process for inputting data and specifying the data to be the object of processing according to the data inputting end accepted. In step S406, it is determined whether the selection of a data outputting end from where data is to be outputted is completed or not, and if it is completed, the process proceeds to step S420, but if it is not completed, the process proceeds to step S408.

In step S408, the selection of the data outputting end is accepted. If the selection of the data outputting end is accepted, the process proceeds to step S410, but if it is not accepted, the process returns to step S402. In step S410, it is determined whether a "person" is selected as the data outputting end or not. If a "person" is selected as the data outputting end, the process proceeds to step S412, but if a data outputting end other than a "person" is selected, the process proceeds to step S418. The BOX transmission is set by the selection of a "person." In step S418, a process of selecting the data outputting end is executed. In the process of selecting the data outputting end, the data outputting end that was accepted is selected. In step S412, a user list window is displayed on display portion 119B. Then, the user designated in the user list window is set as the destination (step S414). Thus, the destination of the BOX transmission is set. In the next step, S416, it is determined whether the selection of the data inputting end is completed or not, and if it is completed, the process proceeds to step S420, and if it is not completed, the process returns to step S402.

Figure 10:
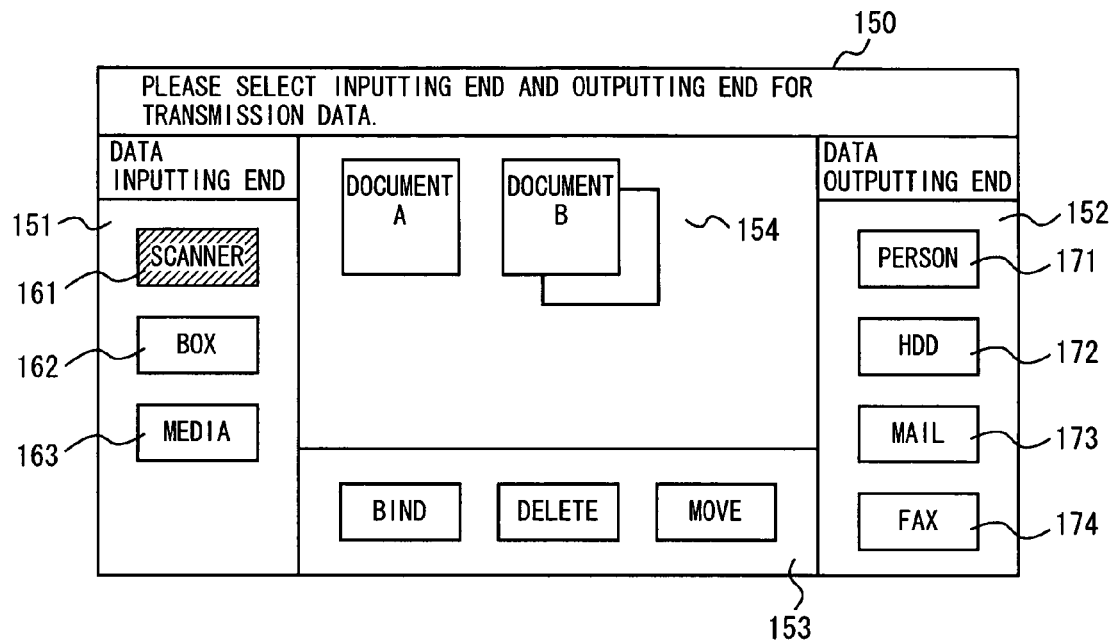
FIG. 10 is a diagram showing an example of a job setting window.

FIG. 10 is a diagram showing an example of a job setting window. With reference to FIG. 10, a job setting window 150 includes an area 151 for accepting an instruction of the selection of the data inputting end, an area 153 for instructing edition of data inputted, an area 154 for accepting designation of image data to be transmitted, and an area 152 for accepting an instruction of the selection of the data outputting end. Area 151 includes a button 161 for instructing an input of data from scanner 113, a button 162 for designating an area of HDD 107, and a button 163 for instructing reading of data from storage media such as flash ROM 108. When button 161 is instructed, scanner 113 is activated and a thumbnail of data outputted by scanner 113 is displayed in area 154. When button 162 is instructed, a list of image data stored in an area of HDD 107 corresponding to that button is displayed, and a thumbnail that displays in reduction the image data selected from that list is displayed in area 154. When button 163 is instructed, a thumbnail of data read from flash ROM 108 is displayed in area 154.

By instructing on the thumbnail displayed in area 154, the data corresponding to the instructed thumbnail is designated as the object of transmission. In addition, when the button displayed in area 153 is instructed, such processes as a bind process of putting together a plurality of image data, a deletion process of deleting the image data from the object of selection, and a move process for changing the order are executed on the image data designated in area 154.

An area 152 is an area for setting an instruction of the selection of the data outputting end. Area 152 includes a button 171 for designating a "person" as the outputting end, a button 172 for designating HDD 107 as the outputting end, a button 173 for designating an electronic mail as the outputting end, and a button 174 for designating FAX 117 as the outputting end. The instruction of button 171 corresponds to designating the BOX transmission as an output method. The BOX transmission requires user identification information to be designated as the destination of transmission. Thus, when button 171 is instructed, the user list window for specifying the user identification information is displayed.

Figure 11:
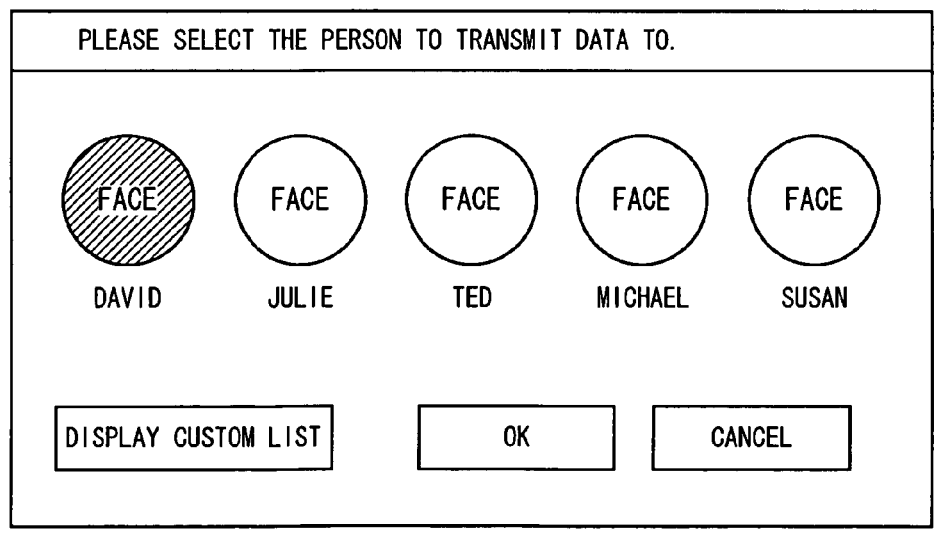
FIG. 11 is a diagram showing an example of a user list window.

FIG. 11 is a diagram showing an example of the user list window. With reference to FIG. 11, the user list window is a window for displaying a list of user names (user identification information) and face image data of users stored in a user list. Moreover, although an area presenting the characters "FACE" is shown in the diagram for convenience, in practice the face image will be displayed. When any one of the face images displayed in the user list window is instructed, the user identification information corresponding to the image data of that face image is obtained from the user list. In the BOX transmission, this user identification information will be set as the destination. Moreover, the user identification information may be inputted without having the face image displayed. In this manner, the BOX transmission is set by instructing on button 171 for designating a "person" as the outputting end, and the destination of the BOX transmission is designated by designating a face image or the user identification information in the user list window.

Going back to FIG. 10, the instruction of button 172 corresponds to designating storage into HDD 107 as the output method. Thus, when button 172 is instructed, a process of selecting the data outputting end is executed. In the process of selecting the data outputting end in the case where button 172 is instructed, first, a window for specifying a HDD area (folder name) to store the data is displayed, and then an input for specifying the HDD area is accepted. The instruction of button 173 corresponds to designating an electronic mail transmission as the output method. Thus, when button 173 is instructed, a process of selecting the data outputting end is executed. In the process of selecting the data outputting end in the case where button 173 is instructed, an address book window for specifying a destination of an electronic mail is displayed, and an input of an electronic mail address is accepted. The address book window is a window which displays in a view the electronic mail addresses and the user identification information of user data stored in the user list. When any one of the user identification information displayed in the address book window is designated, an electronic mail is generated with the designated electronic mail address set as the destination. The instruction of button 174 corresponds to designating a facsimile transmission as the output method. When button 174 is instructed, a process of selecting the data outputting end is executed. In the process of selecting the data outputting end in the case where button 174 is instructed, a window for specifying a destination of the facsimile transmission is displayed, and an input of a facsimile number is accepted.

Going back to FIG. 9, in steps S402 to S416, the selection of a data inputting end and the selection of a data outputting end are executed. By the designation of the data inputting end, the data which is the object of processing, or processing object data, is specified, and by the designation of the data outputting end, the output method is specified.

In the next step, S420, the process stands by until a start button of operation panel 119 is operated (NO in step S420), and when the start button is pressed, the process proceeds to step S422. In step S422, it is determined whether the data outputting end designated is a "person" or not. If a "person" is designated as the data outputting end, the process proceeds to step S424, but if a data outputting end other than a "person"

is designated, the process proceeds to step S430. A "person" is designated when button 171 is instructed in the job setting window. In step S430, data is outputted at the designated outputting end. Thus, the data designated as the processing object data in step S404 is outputted at the outputting end selected in step S418. More specifically, when button 172 is instructed, the process of storing the processing object data in the specified HDD area (folder name) is executed. In addition, when button 173 is instructed, a process of transmitting the processing object data as an attachment to an electronic mail is executed with the designated electronic mail address set as the destination. When button 174 is instructed, a process of transmitting the processing object data to the designated facsimile number by facsimile transmission is executed.

The process proceeds to step S424 in the case where button 171 is instructed. In such a case, the processing object data is transmitted by the BOX transmission. The BOX transmission is a process of transmitting the processing object data to a home terminal which registers the user designated as the destination in step S414. Thus, in step S424, it is determined whether the designated user uses MFP 100 itself as a home terminal or not. If YES, the process proceeds to step S426, and if NO, the process proceeds to step S428. In step S428, the processing object data is transmitted to an MFP of MFPs 100A, 100B, and 100C at which the designated user is registered.

On the other hand, in step S426, the processing object data is processed by a processing method registered by a user. MFP 100 which is a home terminal searches user information stored in HDD 107 and extracts the processing method stored in correspondence to the user identification information of the designated user. Then, the processing object data is processed by the extracted processing method. Thus, in the case where "data storage" is set as the processing method, the processing object data is stored in association with the user identification information in a prescribed area of HDD 107 of MFP 100 which is a home terminal. Later on, at the point when the user logs in at MFP 100 which is a home terminal, the processing object data is read and outputted by a method designated by the user. Moreover, at the point when the user logs in at another MFP 100A, 100B, or 100C, the processing object data is read and transmitted to another MFP 100A, 100B, or 100C where the user has logged in. Then, the received processing object data is outputted at another MFP 100A, 100B, or 100C where the user has logged in according to the method designated by the user.

In the case where "print" is set as the processing method, the processing object data is printed by a designated apparatus. For instance, if the apparatus identification information of printer 201 is set in the processing method, the processing object data is printed by printer 201. In the case where "mail reception" is set as the processing method, the processing object data is transmitted by an electronic mail. The destination of the electronic mail is the electronic mail address set by the processing method. In the case where "FAX reception" is set as the processing method, the processing object data is transmitted by facsimile. The destination of the facsimile transmission is the facsimile number set by the processing method.

Figure 12:
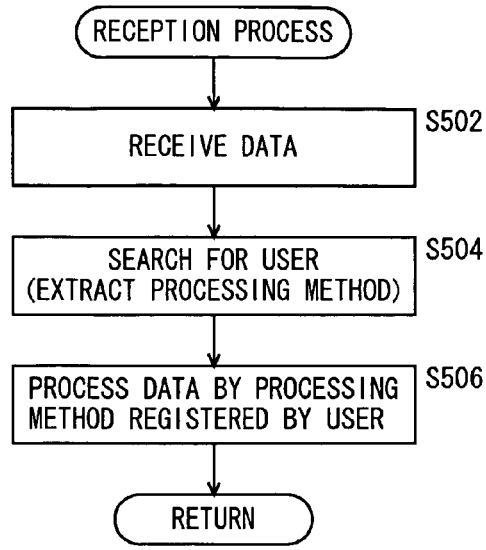
FIG. 12 is a flow chart showing a flow of a reception process executed in step S114 of FIG. 3.

FIG. 12 is a flow chart showing a flow of the reception process executed in step S114 of FIG. 3. The reception process is a process executed at a home terminal in the BOX transmission. With reference to FIG. 12, in the reception process, first, data is received from one of other MFPs 100A, 100B, and 100C (step S502). Along with this data, the user identification information of the user who is set as the destination is received. Then, user information stored in HDD 107 is searched using the received user identification information (step S504). By this search, the processing method of the user information matching the received user identification information is extracted. Then, the received data is processed by the extracted processing method. The process executed here is similar to that described in step S426 of FIG. 9.

Moreover, according to this embodiment, the BOX transmission involves a transmission of the processing object data itself. Thus, data is transmitted in step S428 of FIG. 9, and the processing object data is received in step S502 of FIG. 12. In step S428, without transmitting the data itself, the processing object data may be stored in HDD 107, and the user identification information of the user who is to be set as the destination may be transmitted to a home terminal. In such a case, it becomes possible to process the processing object data at a terminal that stores the processing object data. Thus, when the user identification information is received at a home terminal, the processing method stored in the user information in association with the user identification information is extracted, and that processing method is transmitted back to the terminal that transmitted the user identification information. At the terminal that stores the processing object data, the processing object data is processed according to the received processing method.

In addition, according to the present embodiment, the user list includes registered user information of users registered in all of MFPs 100, 100A, 100B, and 100C; however, the user list may be one that includes user information which includes a processing method in addition to the registered user information. In this way, even when the terminal into which the processing object data is inputted is not a home terminal of the user who was set as the destination, the processing method registered in the home terminal by the user who was set as the destination can be determined so that the processing object data can be processed by the processing method that the user had registered in the home terminal without having to transmit the processing object data to the home terminal.

Figure 13:
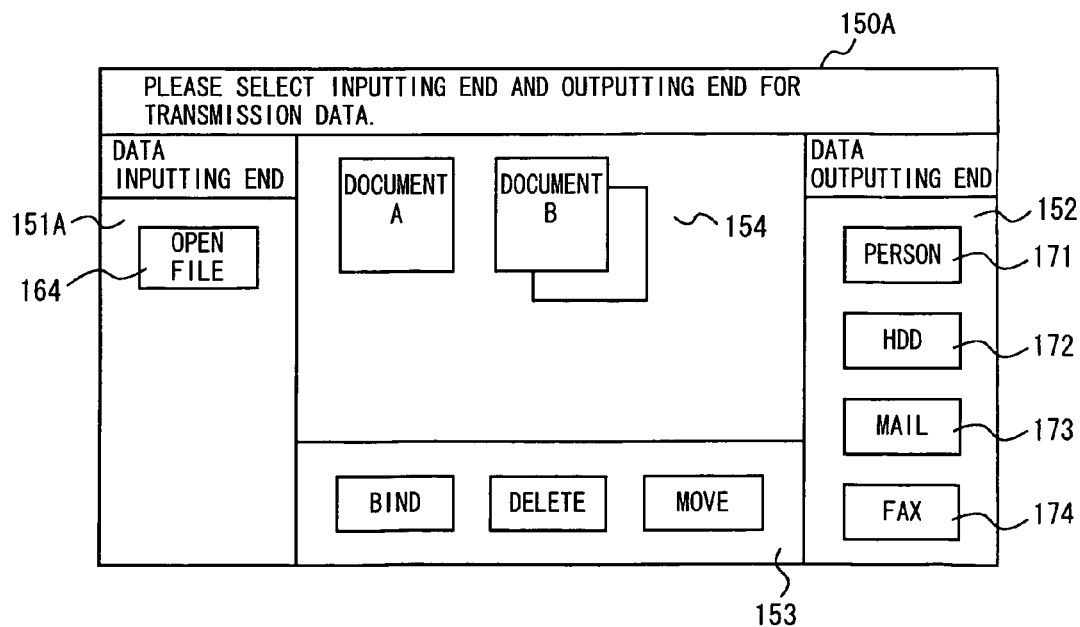
FIG. 13 is a diagram showing an example of a job setting window displayed on a display when the output process is executed in a PC.

Moreover, the above-described output process may be executed by PCs 200 and 200A. In this case, the user list creation process shown in FIG. 7 is executed by PCs 200 and 200A and the user list is stored in PCs 200 and 200A. FIG. 13 is a diagram showing an example of a job setting window displayed on a display when the output process is executed in a PC. With reference to FIG. 13, a job setting window 200A outputted by PCs 200 and 200A differs from job setting window 200 shown in FIG. 10 in that an area 151A for designating a data inputting end only includes a button 164 for designating a file. When button 164 is instructed, a window is displayed for designating data stored in a storage device such as a HDD provided in PCs 200 and 200A, and designation of any data becomes possible. Moreover, the data that can be designated is not limited to the data stored in a HDD, and it may be data stored in an external storage device connected to PCs 200 and 200A. The external storage device needs only to be a device that can be connected to PCs 200 and 200A, such as an IC card or a flash memory. Further, the data stored in the storage device of PC 200A may be designated from PC 200. In this case, the designated data is transmitted from PC 200A to PC 200 so that the processing object data is received by PC 200. Furthermore, when PC 200 is connected to a scanner, the image data scanned by that scanner may be designated.

In addition, although the output process and the reception process are executed by MFPs 100, 100A, 100B, and 100C in this embodiment, server 300 alone may execute the reception process. In such a case, user information registering the processing methods of all users is stored in server 300. As a result, the user registration process shown in FIG. 4 is executed in server 300 alone. Thus, the user information including the processing methods and registered user information of all users is stored in server 300. When the output process shown in FIG. 9 is executed, MFPs 100, 100A, 100B, and 100C will be receiving the user list from server 300 at a stage prior to displaying the user list window in step S412. Furthermore, steps S424, S426, and S428 are unnecessary, and in the case where it is determined in step S422 that the data outputting end is a "person," the data will be transmitted to server 300 along with the user identification information.

As described above, when the user registration process is executed in MFP 100 according to this embodiment, registered user information and a processing method for processing data are inputted, and user information is stored. Thus, the registered user information and the data processing method is registered for each user. Then, the user list is generated when the user list creation process is executed in MFP 100. The user list associates apparatus identification information of a home terminal with user identification information of a user registered in MFPs 100, 100A, 100B, and 100C. When the output process is executed in MFP 100 and button 171 for designating a "person" as the outputting end in area 152 of job setting window 150 is instructed, the BOX transmission is set. Then, the user list window for specifying the user identification information is displayed, and when a face image displayed in the user list window is instructed, the user identification information corresponding to the image data of that face image is obtained from the user list. In the BOX transmission, the data is transmitted to a home terminal of the user of the user identification information. Therefore, simply by designating a face image (person) in the user list window, the destination for the BOX transmission would be designated. In other words, the user list window is a window for displaying a registered user in such a manner that the user can be designated as a destination. Thus, in the BOX transmission, there is no need to input the information of a destination, and it is only required to designate the user as the destination. Moreover, when one of button 161 for instructing an input of data from scanner 113, button 162 for designating an area of HDD 107, and button 163 for instructing reading of data from storage media such as flash ROM 108 is instructed in area 151 for accepting an instruction of the selection of the data inputting end in job setting window 150, the data to be the object of the BOX transmission is designated. The designated data is transmitted to a home terminal of the user by the BOX transmission.

On the other hand, when the reception process is executed in MFP 100, and the data transmitted by the BOX transmission by one of other MFPs 100A, 100B, and 100C is received by MFP 100, user information stored in HDD 107 is searched using the user identification information of the user who is set as the destination received along with the data. By this search, the processing method of the user information matching the received user identification information is extracted. Then, the received data is processed by the extracted processing method. Thus, the sender can deliver the data without confirming the processing method desired by the user who is set as the destination, and the user at the destination can obtain data processed by a desired processing method.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data processing system, comprising a plurality of image processing apparatuses, each connected to a network, wherein each of said plurality of image processing apparatuses includes:
    a registration portion to register for each user a processing method for processing data;
    a destination designation portion to display a user registered in said registration portion of another image processing apparatus in such a manner that the user can be designated as a destination;
    a data designation portion to designate data to be delivered to the destination designated by said destination designation portion;
    a data transmission portion to transmit the data designated by said data designation portion to the destination designated by said destination designation portion; and
    a data processing portion to process data by the processing method registered in said registration portion for said user if data whose destination is the user registered in said registration portion has been delivered.

2. The data processing system according to claim 1, wherein
    said destination designation portion displays on an operation panel provided in said image processing apparatus.

3. The data processing system according to claim 1, wherein said destination designation portion displays a destination using a user name of the user registered in said registration portion.

4. A data processing system comprising an image processing apparatus and a computer respectively connected to a network, wherein
    said image processing apparatus includes a registration portion to register for each user a processing method for processing data, and a data processing portion to process data by the processing method registered in said registration portion for said user if data whose destination is the user registered in said registration portion has been delivered,
    said computer includes a destination designation portion to display a user registered in said registration portion of another image processing apparatus in such a manner that the user can be designated as a destination,
    a data designation portion to designate data to be delivered to the destination designated by said destination designation portion, and
    a data transmission portion to transmit the data designated by said data designation portion to the destination designated by said destination designation portion.

5. A data processing system comprising a computer and image processing apparatuses each connected to a network, wherein
    said computer includes a registration portion to register for each user a processing method for processing data, and
    a data processing portion to process data by the processing method registered in said registration portion for said user if data whose destination is the user registered in said registration portion has been delivered,
    each of said image processing apparatuses at least includes a destination designation portion to display a user registered in said registration portion of said computer in such a manner that the user can be designated as a destination,
    a data designation portion to designate data to be delivered to the destination designated by said destination designation portion, and a data transmission portion to transmit the data designated by said data designation portion to the destination designated by said destination designation portion.

6. A data processing method, comprising the steps of:
registering for each user a processing method for processing data as a user information;
displaying a user for whom said processing method is registered as another user information in a network in such a manner that the user can be designated as a destination, and accepting designation of the destination;
designating data to be delivered to said destination designated; and
transmitting the data designated in said designating step to the destination designated in said accepting step;
wherein said registering step, said accepting step, said designating step, and said transmitting step are executed by a plurality of image processing apparatuses each connected to said network; and
wherein said accepting step includes a step of displaying a user, registered by said registering step being executed in another image processing apparatus, in such 7. The data processing method according to claim 6, wherein
said accepting step displays on an operation panel provided in said image processing apparatus the user for whom said processing method is registered.

8. The data processing method according to claim 6, wherein said accepting step includes a step of displaying a destination using a user name of the user registered in said registering step.

9. A data processing method, comprising the steps of:
registering for each user a processing method for processing data as a user information;
displaying a user for whom said processing method is registered as another user information in a network in such a manner that the user can be designated as a destination, and accepting designation of the destination;
designating data to be delivered to said destination designated; and
transmitting the data designated in said designating step to the destination designated in said accepting step;
wherein said registering step is executed by an image processing apparatus connected to said network,
said accepting step, said designating step, and said transmitting step are executed by a computer connected to said network, and
said accepting step executed by said computer includes a step of displaying the user, registered by said registering step being executed by said image processing apparatus, in such a manner that the user can be designated as a destination.

10. A data processing method, comprising the steps of:
registering for each user a processing method for processing data as a user information;
displaying a user for whom said processing method is registered as another user information in a network in such a manner that the user can be designated as a destination, and accepting designation of the destination;
designating data to be delivered to said destination designated; and
transmitting the data designated in said designating step to the destination designated in said accepting step;
wherein at least said accepting step, said designating step, and said transmitting step are executed by image processing apparatuses connected to said network,
said registering step is executed by a computer connected to said network, and
said accepting step executed by each of said image processing apparatuses includes a step of displaying the user, registered by said registering step being executed by said computer, in such a manner that the user can be designated as a destination.

11. A data processing program embodied on a computer readable medium, causing a computer to perform the steps of;
registering for each user a processing method for processing data as a user information;
upon setting output of data,
displaying a user for whom said processing method is registered as another user information in a network in such a manner that the user can be designated as a destination, and accepting designation of the destination; and
designating data to be delivered to said destination designated; and
upon outputting of data,
processing data by the processing method registered for said user if data has been delivered whose destination is the user for whom said processing method is registered as the user information;
transmitting the data designated in said designating step to the destination designated in said accepting step;
causing a plurality of image processing apparatuses each connected to said network to execute said registering step, said accepting step, said designating step, said transmitting step, and said processing step; and
wherein said accepting step includes a step of displaying a user, registered by said registering step being executed in another image processing apparatus, in such 12. The data processing program according to claim 11, wherein said registering step, said accepting step, said designating step, and said processing step are executed by an image processing apparatus, and
said accepting step displays on an operation panel provided in said image processing apparatus the user for whom said processing method is registered.

13. The data processing program according to claim 11, wherein said accepting step includes a step of displaying a destination using a user name of the user registered in said registering step.

14. A data processing program embodied on a computer readable medium, causing a computer to perform the steps of;
registering for each user a processing method for processing data as a user information;
upon setting output of data,
displaying a user for whom said processing method is registered as another user information in a network in such a manner that the user can be designated as a destination, and accepting designation of the destination; and
designating data to be delivered to said destination designated; and
upon outputting of data,
processing data by the processing method registered for said user if data has been delivered whose destination is the user for whom said processing method is registered as the user information; and
transmitting the data designated in said designating step to the destination designated in said accepting step;

wherein at least said registering step and said processing step are executed by an image processing apparatus connected to said network, said accepting step, said designating step, and said transmitting step are executed by a computer connected to said network, and said accepting step executed by said computer includes a step of displaying the user, registered by said registering step being executed by said image processing apparatus, in such a manner that the user can be designated as a destination.

15. A data processing program embodied on a computer readable medium, causing a computer to perform the steps of:

registering for each user a processing method for processing data as a user information;

upon setting output of data, displaying a user for whom said processing method is registered as another user information in a network in such a manner that the user can be designated as a destination, and accepting designation of the destination; and designating data to be delivered to said destination designated; and upon outputting of data, processing data by the processing method registered for said user if data has been delivered whose destination is the user for whom said processing method is registered as the user information;

transmitting the data designated in said designating step to the destination designated in said accepting step;

wherein at least said accepting step, said designating step, and said transmitting step are executed by image processing apparatuses connected to said network, said registering step and said processing step are executed by a computer connected to said network, and said accepting step executed by each of said image processing apparatuses includes a step of displaying the user, registered by said registering step being executed by said computer, in such a manner that the user can be designated as a destination.

* * * * *

UNITED STATES PATENT AND TRADEMARK OFFICE
CERTIFICATE OF CORRECTION

PATENT NO. : 7,652,781 B2 Page 1 of 1
APPLICATION NO. : 11/254738
DATED : January 26, 2010
INVENTOR(S) : Fukui et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 932 days.

Signed and Sealed this

Twenty-third Day of November, 2010

David J. Kappos
*Director of the United States Patent and Trademark Office*